Patented Sept. 1, 1953

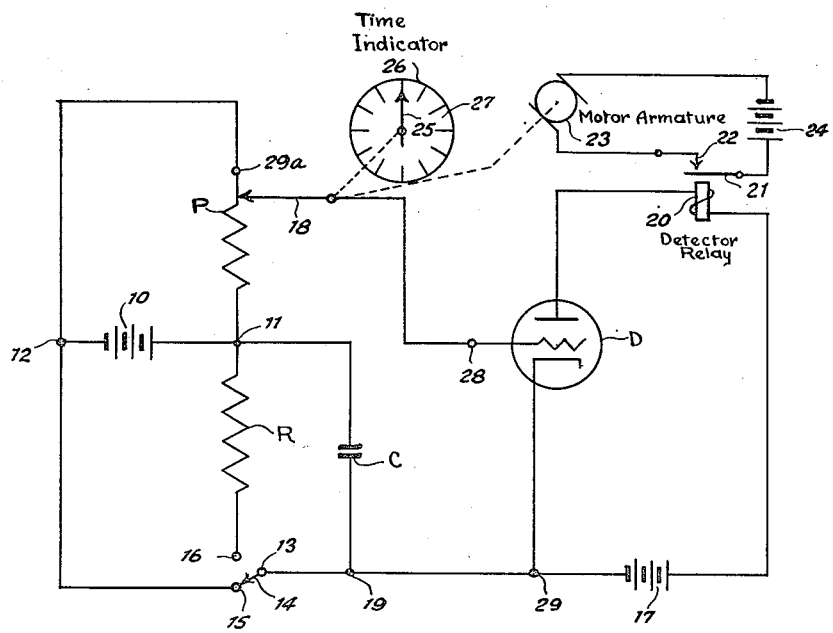

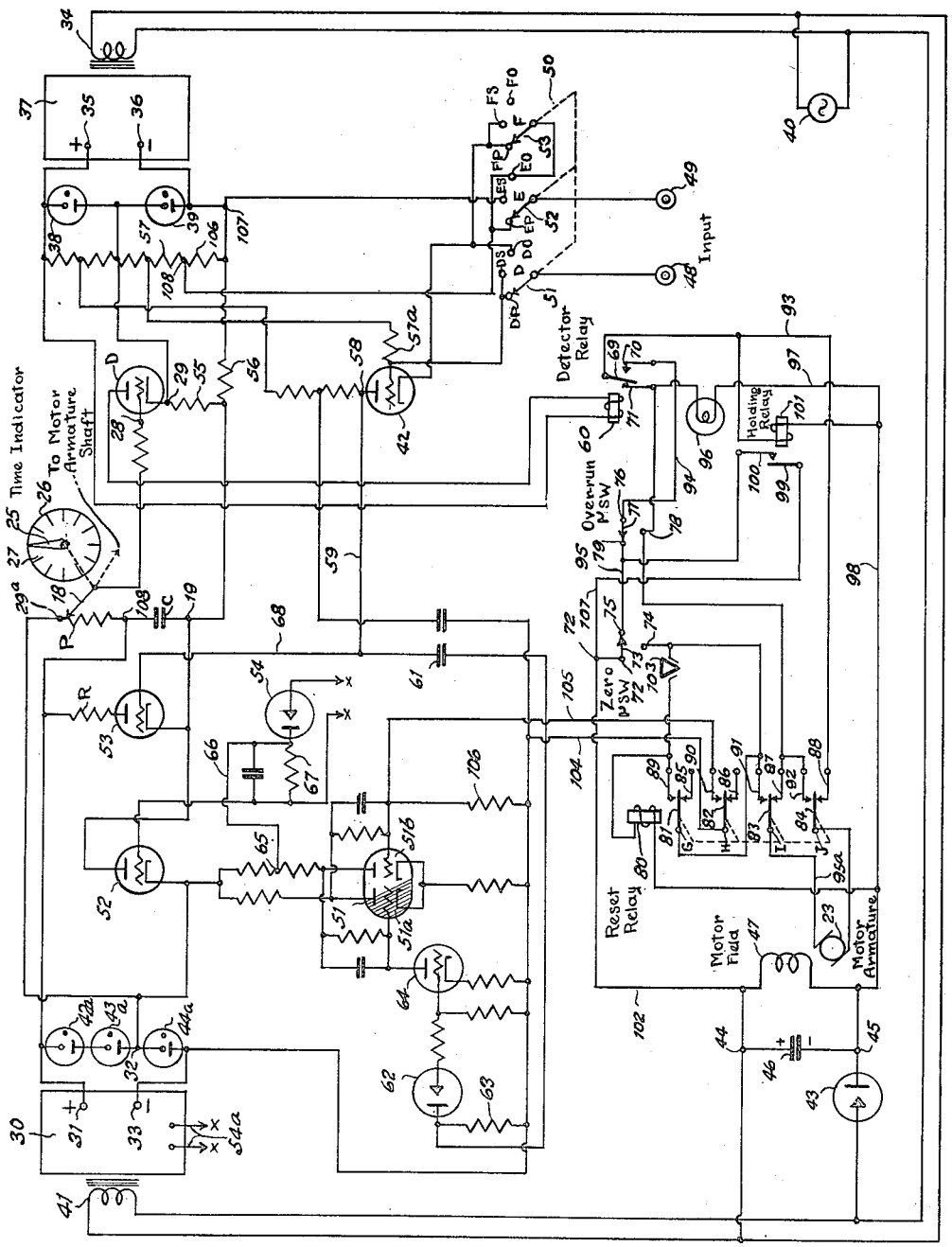

2,651,022

UNITED STATES PATENT OFFICE 2,651,022

TIME MEASUREMENT SYSTEM

Edwin F. Shelley, New York, N. Y., assignor to American Chronoscope Corporation, Mount Vernon, N. Y., a corporation of New York Application June 4, 1949, Serial No. 97,200

10 Claims. (Cl. 324—68)

The present invention relates to a simple time measurement system capable of measuring time intervals with a relatively high degree of accuracy.

Presently, in design and testing procedures in order to measure time intervals and particularly time intervals in the millisecond to microsecond range, with a degree of accuracy of the order of 1%, cumbersome and time-consuming systems are employed. These make use of relatively expensive items of equipment such as stable oscillators, oscilloscopes, counters and other devices. Thus the all-important variable of time has not been measurable with the ease and convenience with which other standard variables such as voltage, amperage and resistance have been ascertainable.

An object of my invention is to provide a simple, relatively inexpensive, time measurement system.

A further object of my invention is to provide a time measurement system capable of measuring time intervals of the order of seconds to microseconds and beyond with a relatively high degree of accuracy.

Another object of my invention is the provision of a time meter which may be used with the same ease, convenience and simplicity of employment as other standard instruments such as voltmeters, ammeters and the like.

Still another object of my invention is the provision of a time meter adapted to accurately measure short time intervals and display the measurement mechanically in easily readable form.

Other objects and a fuller understanding of my invention may be had by referring to the following description and claims, taken in conjunction with the accompanying drawings which illustrate preferred embodiments thereof, it being understood that the foregoing statement of the objects of my invention is intended to generally explain the same without limiting it in any manner.

Fig. 1 is a schematic diagram of a simple time measurement system embodying my invention.

Fig. 2 is a schematic of a more elaborate embodiment thereof.

Referring to the drawings and more particularly to the embodiment of the invention shown in Fig. 1, it comprises a balance voltage source 10, having positive and negative terminals respectively 11 and 12, a balance potentiometer P across its output, a timing capacitor C switchably in parallel therewith through center arm 14 and contact 15 of single-pole double-throw charge-discharge switch 13, a timing resistor R switchably in parallel with said timing capacitor C through center arm 14 and contact 16 of said switch, a detector circuit including a detector tube D powered conventionally by detector voltage source 17 and which has its grid terminal 28 connected to potentiometer arm 18 of balance potentiometer P, while its cathode terminal 29 is connected to terminal 19 of timing capacitor C, that being the terminal thereof not common to said capacitor and balance potentiometer P, and a direct-current detector relay 20 in series between the plate of detector tube D and the positive terminal of detector voltage source 17, said relay being adapted to break the contact between its armature 21 and contact 22 when energized. Motor armature 23, which is part of a conventional motor not shown, is connected through said relay contact 22 and relay armature 21 to its power, motor voltage source 24, and its shaft is mechanically linked, preferably by a system of gears to both potentiometer arm 18 and pointer 25 in time indicator 26, in such fashion that when said motor armature revolves said arm and pointer rotate an angular distance proportional to the number of such revolutions. Time indicator 26 may comprise merely a dial face 27 calibrated in suitable time units and said pointer 25 rotatably mounted thereon in conventional fashion. The heater of detector tube D and connections thereto and power source thereof are not shown, the same being conventional.

As is readily apparent, the above-described system is based on the familiar principle that the dimensional product of electrical resistance by electrical capacitance is time. Thus if an initially charged capacitor is permitted to discharge through a resistance for an unknown time $t$, then at the end of said interval the capacitance will have discharged to a certain fraction of its initial voltage, and that fraction will be a function only of the capacitance, the resistance and the discharging time $t$. It follows that if the values of resistance and capacitance are known, then discharging time $t$ may be ascertained by measuring the fraction of the initial voltage which remains across the capacitor. The measurement in the present system is done by means of a self-balancing potentiometer whose center arm is mechanically linked to time indication means.

Thus, if a time interval T is mechanically presented to the system shown in Fig. 1, by maintaining center arm 14 of charge-discharge switch 13 against contact 16 thereof for time T, and if then upon disengagement from said contact said arm is left in a position intermediate contacts 15 and 16, a direct reading of time T may be made from time indicator 26.

As shown in Fig. 1, the system is in the "ready" state, i. e., ready to receive a time interval to be measured. Since center arm 14 of charge-discharge switch 13 is thrown to contact 15 the balance voltage source 10 is connected across timing capacitor C and said capacitor is charged to the full voltage of said source. Potentiometer arm 18 of balance potentiometer P is at its upper limit at terminal 29a which is at the same potential as terminal 19 of timing capacitor C. Since said terminals are connected to the grid and cathode of detector tube D, those elements are at a voltage parity and the tube is conducting and maintaining detector relay 20 in an energized state. It follows that motor armature 23 is motionless, for when energized, said relay opens a lead to motor voltage source 24. Time indicator 26 reads zero.

If then while the system is in the ready state, time T is mechanically presented to it as above described, the following occurs. When center arm 14 of charge-discharge switch moves away from contact 15 thereof it opens the charge circuit of timing capacitor C and leaves C "floating." When said arm meets contact 16 it closes said capacitor's discharge circuit and so long as it remains closed capacitor C will discharge through timing resistor R. However, as timing capacitor C discharges, its terminal 19 becomes less negative in potential with respect to positive terminal 11 of balance voltage source 10 and, conversely more positive with respect to said source's negative terminal 12 and terminal 29a of balance potentiometer P, thus raising the potential of the cathode of detector tube D with respect to its grid. Since the grid then negative with respect to the cathode, detector tube D is either cut off or the flow of plate current is reduced to the point where it is insufficient to maintain detector relay 20 in an energized state. In either case, the same result obtains, i. e., detector relay 20 opens, thus making contact between relay armature 21 and contact 22 and hence energizing motor armature 23. As said armature rotates, it moves pointer 25 off the zero position and drives potentiometer arm 18 of balance potentiometer P in a direction away from terminal 29a thereof. The gear system leading from motor armature 23 to potentiometer arm 18 is so designed that it will move the said arm across the voltage gradient of balance potentiometer P more slowly than the rate of discharge of timing capacitor C and hence more slowly than terminal 19 thereof rises in potential, thus insuring that detector tube D will not conduct sufficiently to stop motor armature 23 during the discharge cycle of said capacitor.

When at the end of time interval T center arm 14 of charge-discharge switch 13 is removed from contact 16 thereof and left in an intermediate position between the two contacts of said switch, timing capacitor C is again left floating and since it can be neither charged nor discharged remains at the fraction of its initial voltage to which it had descended at the instant of said removal. Motor armature 23 will continue to drive potentiometer arm 18 until it reaches a point on the timing potentiometer P where the voltage is equal to the voltage at terminal 19 of timing capacitor C (both voltages being taken with reference to point 11, the common terminal of potentiometer P and timing capacitor C) and then it will stop, for when it reaches such a point the grid and cathode of detector tube D will be at substantially the same voltage and the tube will conduct sufficiently to energize detector relay 20 and thus open the motor armature circuit bringing motor armature 23 to a halt, and consequently stopping both potentiometer arm 18 and pointer 25. Since dial face 27 is calibrated in time units in accordance with the values of timing resistor R and timing capacitor C, the duration of time interval T may be read directly from time indicator 26.

The system may be reset to the ready state by throwing center arm 14 of charge-discharge switch 13 to contact 15 and by reversing the polarity of the motor armature leads which may be done by a conventional reversing switch (not shown) in said leads and thus drive potentiometer arm 18 and pointer 25 back to their original positions.

It is obvious that an equivalent system may be set up in which the circuit elements may be rearranged to charge a timing capacitor C through a resistor R for the duration of the time interval to be measured instead of discharging such capacitor for such interval as has been explained above. In such case the balance potentiometer P would measure the fraction of the voltage of the balance voltage source to which said capacitor was charged and the time indicator may be suitably calibrated in units of time.

The degree of accuracy obtainable with the above-described systems will depend upon the minimization of a number of error sources. First it should be observed that balance voltage source 10 is common to both balance potentiometer P and timing capacitor C. This feature makes the important measuring operation of the system independent of voltage source fluctuations or changes. Then, since the accuracy of a time reading is directly proportional to the constancy of the product of the resistance of timing resistor R and the capacitance of timing capacitor C, if the temperature coefficients of those circuit elements are made equal and opposite, the product of their values can be held exceptionally constant under normal working conditions. The error involved will be a constant percentage error for any reading.

Again, the accuracy of a reading is dependent upon the preciseness with which the setting of potentiometer arm 18 is known. This will depend in general upon the construction of the potentiometer and the calibration of dial face 27. This error tends to be a percentage of the full-scale of the dial face rather than a percentage of the reading taken.

It is also necessary that detector tube D sensitively recognize the condition of zero voltage difference between its grid and cathode. This can be accomplished by employing a tube which possesses a high ratio of transconductance to plate current in the vicinity of zero grid voltage, and by using a relay with stable and preferably sharp pull-in and release characteristics. Any residual variation in detector operation can be minimized by selecting balance voltage source 10 so that it is very large in comparison to the variations in grid voltage required to energize or release detector relay 20.

Obviously, if motor armature 23 continues to rotate appreciably after its power is cut off, a major source of error may be introduced. This may be minimized in any number of conventional fashions including damping and anti-hunt circuits. The combination of shorting the motor armature and having the armature rotate at a relatively low speed has been found to be adequate. In general, leakages across various terminals of circuit components will determine the upper and lower limits within which the system may be employed.

A more elaborate embodiment of my invention is shown in Fig. 2. This form is designed to receive time T, the time interval to be measured as the duration of a voltage pulse or of a short circuit or open circuit. This permits the introduction and measurement of much shorter time intervals. The voltage sources shown in Fig. 1 as batteries have been replaced by electronic power supplies fed from a source of alternating line voltage 40. Thus primary 41, balance power supply 30, which includes a full wave rectifier and filter circuit and which terminates in positive terminal 31 and negative terminal 33, and is regulated by voltage-regulator tubes 42a, 43a, and 44a, with a zero reference terminal 32 intermediate the cathode of tube 43a and the plate of tube 44a, provide a voltage source for timing potentiometer P and charging capacitor C as well as other circuits to be described. Detector voltage source 17 is replaced by detector power supply 37 which derives its power through primary 34 from line source 40 and has positive terminal 35 and negative terminal 36 and across which are placed voltage-regulator tubes 38 and 39 and also bleeder resistors to permit the picking off of intermediate voltages. The detector power supply in addition to providing energy for detector tube D powers input tube 42.

Motor voltage source 24 is replaced by a motor voltage supply comprising a diode rectifier tube 43 connected in series with filter capacitor 46 across line source 40 and having positive terminal 44 and negative terminal 45. This tube in addition to powering motor armature 23, supplies its motor field winding 47 and various guard, control and reset circuits.

Charge-discharge switch 13 of Fig. 1 which performs three functions, namely, those of receiving the input, placing voltage across timing capacitor C to charge it and providing the means of placing timing resistor R across said capacitor to present a discharge path therefor, has been replaced by several components to enable the reception and handling of shorter time intervals. Thus the input circuit in Fig. 2 includes a pair of input terminals, 48 and 49, an input switch 50, having sections respectively D, E and F and each such section having center arms, respectively 51, 52 and 53, and each having contacts, respectively DP, DS, DO, and EP, ES, EO and FP, FS, FO, the "P" contacts being the contacts for "pulse" input, the "S" contacts being those for "short" input and the "O" contacts being those for "open" input. The input circuit also includes input tube 42 which serves to feed the input time intelligence to a flip-flop circuit comprising flip-flop tube 51 and its associated elements which in turn controls charge-switch tube 52 which replaces the charge-switch function of charge-discharge switch 13 of Fig. 1. Input tube 42 also feeds the input time intelligence to discharge-switch tube 53 which replaces the discharge-switch function of said switch 13. The heaters of the various tubes and the connections thereto and the power source thereof are not shown, the same being conventional.

The operation of this embodiment may best be understood by tracing the path of a time input signal therethrough and observing the response of the various circuits thereto. As shown in Fig. 2, the system is in the ready state. As shown by the shading, section 51a of flip-flop tube 51 is conducting, permitting charge-switch tube 52 to conduct, the latter having a positive bias on its grid derived from bias diode 54 which is fed from a low voltage output 54a from balance power supply 30. Hence timing capacitor C is kept charged by the same power supply through said charge-switch tube. Detector tube D is conducting sufficiently to keep detector relay 60 energized. Its grid and cathode will be deemed to be at the same potential, although, as is obvious, the grid is biased slightly negatively, in order to establish a suitable operating point for the tube and detector relay 60, preferably in the order of about one volt, by resistor 55 and large dropping resistor 56 and in addition there is a slight drop in the order of tenths of a volt across charge-switch tube 52. Motor armature 23 is not rotating, pointer 25 of time indicator 26 is at zero and center arm 18 of timing potentiometer P is at its lowest voltage point, i. e., at terminal 29a thereof. Input tube 42 is conducting, its grid receiving a slight positive bias across resistor 57, a part of the bleeder network across the output of detector power supply 37 and through grid resistor 57a in series with said grid. Input switch 50 is shown in the "pulse" position, indicating that the system is set to receive a voltage pulse and measure its duration.

If then such a pulse of time T and of sufficient amplitude is introduced across input terminals 48 and 49, such that terminal 49 is treated as the positive terminal then the pulse will cut off input tube 42 by raising its cathode higher than its grid overcoming the slight positive grid bias. The sharper the pulse the more sharply will the tube be cut off and the more rapidly will the voltage rise at plate terminal 58 thereof. The ascending voltage wave front will travel through lead 59, through coupling capacitor 61 and to the plate of flip-flop input tube 62, the said voltage wave being differentiated by action of said capacitor 61 and resistor 63 in the plate circuit of said tube. The incoming pulse drives the plate of the flip-flop tube 62 positive, thus causing this diode to conduct and producing a sharply ascending voltage front on the grid of tube 64 causing it to strongly conduct and thereby sharply driving down its plate and hence driving the grid on section 51a of flip-flop tube 51 negative, cutting off that section and thereby causing section 51b to conduct. Since flip-flop tube 51 and its associated circuit elements is a conventional flip-flop arrangement, it will not be more fully described except to state that when the conducting section is cut off, the other section will conduct and will continue to conduct until the conducting section is itself cut off, thereby sending a positive pulse to the non-conducting section and causing it to conduct. When section 51b of said tube conducts, point 65 in its plate circuit is driven in a negative direction and remains at a relatively negative voltage potential during such time as the said section continues to conduct. From point 65 a negative voltage front proceeds through lead 66 and resistor 67 to the grid of charge-switch tube 52 thereby sharply cutting off charge-switch tube 52 by overcoming the positive grid bias on the said tube derived from bias diode 54. Said charge-switch tube will remain cut off during such time as section 51b continues to conduct. It will be remembered that the charge path of timing capacitor C runs through said charge-switch tube, and accordingly, when the said tube is cut off, timing capacitor C can no longer charge from balance power supply 30.

The plate terminal 58 of input tube 42 is directly coupled to the grid of discharge-switch tube 53 through leads 59 and 68. Hence, at the same time as a differentiated pulse is fed to the flip-flop circuit, an undifferentiated positive pulse, being a replica of the input pulse, is transmitted to the grid of said discharge-switch tube 53 and since the forward edge thereof is a positive front, it will cause the said discharge-switch tube to conduct, thereby furnishing a discharge path for timing capacitor C through said tube and through the timing resistor R. Discharge-switch tube 53 will continue to conduct for the duration of the positive pulse, i. e., for the duration of time T, the interval which is to be measured. When the timing pulse ends, discharge-switch tube 53 will no longer conduct and timing capacitor C will cease discharging. However, as in the previous embodiment, it will retain a percentage of the voltage to which it was initially charged and such voltage will be a function of time t.

At this point, it should be noted that when the timing pulse terminates and a negative voltage wave form is presented at the plate of flip-flop input tube 62, that tube will not transmit the same, it being a diode and hence section 51b of flip-flop tube 51 will remain conducting keeping charge-switch tube 52 in a cut-off condition so that timing capacitor C will not be able to again charge until the entire system is reset.

In the meantime, as timing capacitor C started to discharge through discharge-switch tube 53 and timing resistor R, terminal 19 of said capacitor started to become more positive with respect to terminal 29a of balance potentiometer P. Since said terminals are respectively and effectively connected to the cathode and grid of detector tube D, the cathode of said tube is raised in potential with respect to its grid, and the said tube is cut off, or as explained with reference to the first embodiment of my invention described, the flow of plate current through said tube is reduced at least to the point where it is insufficient to maintain detector relay 60 in an energized state and accordingly detector relay 60 is de-energized and armature 69 drops down and makes contact with contact 70 thereof breaking its contact with contact 71 thereof. This places motor armature 23 across its source of power, the motor voltage supply consisting of tube 43 and filter capacitor 46 across line 40 and the armature begins to run moving pointer 25 of timing indicator 26 off its zero position and moving potentiometer arm 18 of timing potentiometer P away from terminal 29a thereof and in a direction which enables it to start ascending the voltage gradient across the said potentiometer. To fully explain the path by which power to motor armature 23 is applied thereto, it is necessary to introduce some of the guard and reset elements of the system. Zero microswitch 72 is a single-pole double-throw switch having an arm 73 and contacts 74 and 75. In the ready state of the system, arm 73 is in contact with contact 75. The microswitch is so placed that its arm does not switch over from contact 75 to contact 74 until potentiometer arm 18 of timing potentiometer P has moved some short distance from its position at terminal 29a thereof. Over-run microswitch 76 is also a single-pole double-throw switch, having an arm 77 and contacts 78 and 79. In the ready state of the system arm 77 is in contact with contact 79. It is so located that the arm does not switch over to contact 78 until pointer 25 of timing indicator 26 has passed its full scale reading. Reset relay 80, whose function will be described in greater detail, infra, is a relay having four sections respectively, G, H, I and J, whose armatures respectively 81, 82, 83 and 84 are mechanically linked and make contact when in a de-energized state (as shown in Fig. 2) with contacts respectively 85, 86, 87 and 88, and when energized with contacts respectively 89, 90, 91 and 92.

Contact 70 of detector relay 60 is connected through lead 94, through arm 77 and contact 79 of over-run microswitch 76, through lead 95 and through contact 75 and arm 73 of zero microswitch 72 to positive terminal 44 of motor voltage supply filter capacitor 46. When armature 69 makes contact with contact 70 of said detector relay, since said armature is connected through lead 93 and section J of reset relay 80 to one terminal of motor armature 23, power is therefore connected to said terminal when detector relay 60 is de-energized. The other terminal of said motor armature is connected to the negative terminal 45 of motor voltage supply filter capacitor 46 by a path which follows lead 95a through section I of reset relay 80 through contact 78 of over-run microswitch 76 and through surge lamp 96, preferably an incandescent lamp having a tungsten filament, and then through leads 97 and 98. At the same time a parallel power path for the motor armature to positive terminal 44 of motor voltage supply filter capacitor 46 is provided through armature 99 and contact 100 of holding relay 101, the said relay being energized when armature 69 of detector relay 60 makes contact with contact 70 thereof. The said alternate positive power path for said motor armature runs from said terminal 44 along leads 102 and 107 to armature 99 of holding relay 101 and then through its contact 100 to contact 79 of overrun miscroswitch 76 at which point it joins the first-mentioned path which originates through zero microswitch 72 and contact 75 thereof. This parallel path is necessary, for shortly after motor armature 23 commences to revolve and move pointer 25 from its zero position, arm 73 of zero microswitch 72 breaks contact with contact 75 and makes contact with contact 74 and if there were no alternate path, the first-described power path to said armature would be open.

As in the first embodiment described, motor armature 23 continues to drive potentiometer arm 18 until it reaches a point on timing potentiometer P where the voltage is equal to the voltage at terminal 19 of timing capacitor C, said voltages being taken with reference to point 108, the common terminal of timing potentiometer P and timing capacitor C. When this point on timing potentiometer P is reached, the grid and cathode of detector tube D are at the same voltage and the said tube again conducts sufficiently to energize detector relay 60, removing armature 69 thereof from contact 70, thus opening the power circuit to motor armature 23 and de-energizing holding relay 101 as well as shorting said motor armature by making contact with contact 71, thus abruptly bringing said motor armature to a halt and simultaneously halting the further movement of both potentiometer arm 18 and pointer 25. At this point a reading of the time interval T which was originally introduced to the system by means of the voltage pulse to be measured may now be made directly from the graduation on dial face 27 beneath pointer 25.

By designing the motor armature 23 to move pointer 25 so slowly that it might take some three seconds to traverse the full scale of time indicator 26, then even if said armature coasted for three milliseconds after it has been disconnected from its source of power and has been shorted, there would be an error of only $\frac{1}{10}$ of 1% of full-scale reading. The treatment of minimization of error sources set forth above in connection with the description of the embodiment shown in Fig. 1 obtains in connection with the embodiment of Fig. 2.

The guard circuit is included to insure that the reading on time indicator 26 will remain until the system is reset. If a second time pulse should be presented to the system before it is reset, or if the instrument should be left without resetting for a sufficient time to permit timing capacitor C to leak sufficiently to cut off detector tube D and hence energize detector relay 60, motor armature 23 would not run for the reason that the arm of zero microswitch 72 is now at contact 74 and there would be no positive power path to the motor armature, it being remembered that holding relay 101 would now again be open.

Additional accuracy may be obtained if only the first third of the discharge curve of timing capacitor C is employed, since said first third is substantially linear. This is insured by calibrating time indicator 26 so that only one-third of the discharge curve of timing capacitor C is traversed when pointer 25 reads full scale and by placing over-run microswitch 76 to be actuated to remove arm 77 thereof from contact 79 and place it on contact 78 when the said pointer just passes full scale. When over-run microswitch 76 is so actuated, it opens the power path of said motor armature and shorts the said armature.

After a reading has been taken, before presenting another timing pulse, it is necessary to reset the system. This is done by pressing reset button 103 which has the effect of actuating reset relay 80, it being remembered that at this time arm 73 of zero microswitch 72 is resting against contact 74 thereof. This brings all of the four armatures of the said relay into contact with the upper contacts shown adjacent to them in Fig. 2. Section G of said relay operates as a holding relay so that when reset button 103 is released, the said relay remains energized. Section H of said relay acts to short leads 104 and 105 and hence shorts resistor 106 in the grid circuit of section 51b of flip-flop tube 51, the effect of which is to produce a drop in grid potential and hence a reversal of the flip-flop circuit so that section 51b is cut off and section 51a then conducts. Sections I and J serve to reverse the polarity of the leads to motor armature 23 and hence start the same rotating in a direction opposite to its previous direction of rotation, thus driving potentiometer arm 18 of timing potentiometer P and pointer 25 of time indicator 26 toward their zero positions. This reverse rotation will continue until zero microswitch 72 is engaged, the microswitch being set to be engaged at approximately the zero position of potentiometer arm 18 and pointer 25. When said microswitch is so engaged, arm 73 thereof is switched from contact 74 to contact 75, thus deenergizing reset relay 80 and cutting off power to motor armature 23. The system would then again be in the ready state.

The operation of the system has been described with input switch 50 in the "pulse" position. If input switch 50 is placed in the "short" position, i. e., so that in each of its sections the center arms engage respectively contacts DS, ES and FS, then the system will measure the duration of a short circuit across input terminals 48 and 49. This is so for the reason that when switch 50 is thrown to the said "short" position and input terminal 48 shorted to input terminal 49, the grid of input tube 52 is connected through the D section of said switch through the input terminals and the E section of said switch to point 107 which is at the potential of the negative terminal of detector power supply 37, while the cathode of said tube through section F of said switch is connected to point 108 on the bleeder across said power supply thus effectively biasing the said cathode positively with respect to said grid by the voltage developed across resistor 106, and hence cutting off tube 42 and starting the timing cycle of the system as above described. When the short circuit is removed, input tube 42 will again conduct and as above described, the system will indicate the duration of the short circuit.

When switch 50 is placed in the "open" position, namely where the center arms of the D, E and F sections rest against contacts DO, EO and FO respectively, the system will measure the duration of an open circuit between the input terminals. This is so for when the input terminals are opened, with the said input switch in said position, the cathode circuit of input tube 42 is open and the tube ceases conduction, thereby setting in motion the timing cycle above described. When contact between input terminals 48 and 49 is restored, the tube will again conduct and hence in the manner above described, the system will indicate the duration of the open circuit.

I have shown preferred embodiments of my invention, but it is obvious that numerous changes, omissions, alterations and refinements may be made without departing from its spirit. Thus various of the critical resistances of the circuit might have variable resistors in series with them so that they might be adjusted from time to time. Again it is obvious that by providing a plurality of timing resistors of different values instead of the single timing resistor R, as shown, and by providing a plurality of timing capacitors of different values instead of timing capacitor C and arranging said components through a suitable two-pole range switch, the system may be given a variety of ranges selectable by variously positioning the switch.

When in the claims reference is made to the fact that one circuit element is "connected to" another, or "through" another or "to a terminal" of another, it is not meant to indicate that there are no circuit elements between such elements so indicated to be connected and there may be other circuit elements between said elements.

Although I have described my invention with a certain degree of particularity, it is understood that the present disclosure has been made only by way of example and that numerous additional changes in the details of design, construction, combination and arrangement of parts may be resorted to without transcending the scope of the invention as hereinafter claimed.

I claim as my invention:

1. A time measurement system comprising reception means to receive a signal delineating a time interval, including means to transmit said signal in the form of a voltage pulse equal in width to the duration of said time interval, a timing capacitor, a first voltage source to charge said capacitor, a timing resistor, means responsive to said signal to cause the discharge of said timing capacitor through said resistor for a period of time equal to said time interval comprising first switch means intermediate said timing capacitor and said first voltage source, a flip-flop circuit controlling said switch means and adapted to open the same upon receiving the forward edge of a pulse from said reception means and hence remove said first voltage source from said timing capacitor, second switch means connecting said timing resistor across said capacitor when said second switch means are closed, said second switch means being adapted to close upon receiving the forward edge of a pulse from said reception means and to open and remove said resistor from said capacitor at the termination of said pulse and means to measure the voltage across said capacitor at the end of said period of time including a potentiometer having a resistance element and a movable arm in contact therewith, said first voltage source being connected across said resistance element, and means associated with said capacitor and potentiometer adapted to move the arm of said potentiometer across said resistance element to a voltage point thereon which bears a predetermined relationship to the voltage across said capacitor at the end of said period of time.

2. A time measurement system as described in claim 1, said means associated with said capacitor to move said potentiometer arm being related to said arm so as to move the same across the potential gradient of said resistance element more slowly than the change of voltage across said capacitor.

3. A time measurement system comprising reception means to receive a signal delineating a time interval, including means to transmit said signal in the form of a voltage pulse equal in width to the duration of said time interval, a timing capacitor, a first voltage source to charge said capacitor, a timing resistor, means responsive to said signal to cause the discharge of said timing capacitor through said resistor for a period of time equal to said time interval comprising first switch means intermediate said timing capacitor and said first voltage source, a flip-flop circuit controlling said switch means and adapted to open the same upon receiving the forward edge of a pulse from said reception means and hence remove said first voltage source from said timing capacitor, second switch means connecting said timing resistor across said capacitor when said second switch means are closed, said second switch means being adapted to close upon receiving the forward edge of a pulse from said reception means and to open and remove said resistor from said capacitor at the termination of said pulse and means to measure the voltage across said capacitor at the end of said period of time including a potentiometer having a resistance element and a movable arm in contact therewith, said first voltage source being connected across said resistance element, said timing capacitor having a first terminal common to one terminal of said resistance element and a second terminal not common thereto, a motor coupled to said arm and adapted to move said arm along said resistance element and detector means comprising a detector tube having at least a control grid, a cathode and an anode, the grid-cathode circuit thereof including in series said arm, the portion of said resistance element between said arm and said first terminal and said timing capacitor, and the cathode-anode circuit thereof including a detector voltage source and a relay adapted to close when the cathode-anode current reaches a first predetermined level and to thereby energize said motor, and adapted to open when said current reaches a second predetermined level, said detector tube being biased so as to conduct to the extent necessary to close said relay when a first predetermined voltage is presented across its grid and cathode and hence energize said motor and move said arm and to open said relay when a second predetermined voltage is presented across its grid and cathode and hence de-energize said motor and halt the movement of said arm, said level of cathode-anode current and said bias point being so selected that the point on said resistance element at which said arm is halted will bear a predetermined relationship to said voltage across said capacitor at the end of said period of time.

4. A time measurement system as described in claim 3, said motor being coupled to said arm so as to move the same across the potential gradient of said resistance element more slowly than the change in timing voltage across said timing capacitor.

5. A time measurement system comprising reception means to receive a signal delineating a time interval, including means to transmit said signal in the form of a voltage pulse equal in width to the duration of said time interval, a timing capacitor, a first voltage source to charge said capacitor, a timing resistor in the charge path of said capacitor, means responsive to said signal to cause the timing capacitor to charge from said first voltage source through said timing resistor for a period of time equal to said time interval comprising switch means intermediate said timing capacitor and said first voltage source, a control circuit adapted to close said switch means and connect said capacitor to said voltage source through said timing resistor upon receiving the forward edge of a pulse from said reception means and adapted to open said switch means and disconnect said capacitor from said first voltage source at the termination of said pulse and means to measure the voltage across said capacitor at the end of said period of time including a potentiometer having a resistance element and a movable arm in contact therewith, said first voltage source being connected across said resistance element, and means associated with said capacitor and potentiometer adapted to move the arm of said potentiometer across said resistance element to a voltage point thereon which bears a predetermined relationship to the voltage across said capacitor at the end of said period of time.

6. A time measurement system as described in claim 5, said means associated with said capacitor to move said potentiometer arm being related to said arm so as to move the same across the potential gradient of said resistance element more slowly than the change of voltage across said capacitor.

7. A time measurement system comprising reception means to receive a signal delineating a time interval, including means to transmit said signal in the form of a voltage pulse equal in width to the duration of said time interval, a timing capacitor, a first voltage source to charge said capacitor, a timing resistor in the charge path of said capacitor, means responsive to said signal to cause the timing capacitor to charge from said first voltage source through said timing resistor for a period of time equal to said time interval comprising switch means intermediate said timing capacitor and said first voltage source, a control circuit adapted to close said switch means and connect said capacitor to said voltage source through said timing resistor upon receiving the forward edge of a pulse from said reception means and adapted to open said switch means and disconnect said capacitor from said first voltage source at the termination of said pulse and means to measure the voltage across said capacitor at the end of said period of time including a potentiometer having a resistance element and a movable arm in contact therewith, said first voltage source being connected across said resistance element, said timing capacitor having a first terminal common to one terminal of said resistance element and a second terminal not common thereto, a motor coupled to said arm and adapted to move said arm along said resistance element and detector means comprising a detector tube having at least a control grid, a cathode and an anode, the grid-cathode circuit thereof including in series said arm, the portion of said resistance element between said arm and said first terminal and said timing capacitor, and the cathode-anode circuit thereof including a detector voltage source and a relay adapted to close when the cathode-anode current reaches a first predetermined level and to thereby energize said motor, and adapted to open when said current reaches a second predetermined level, said detector tube being biased so as to conduct to the extent necessary to close said relay when a first predetermined voltage is presented cross its grid and cathode and hence energize said motor and move said arm and to open said relay when a second predetermined voltage is presented across its grid and cathode and hence de-energize said motor and halt the movement of said arm, said level of cathode-anode current and said bias point being so selected that the point on said resistance element at which said arm is halted will bear a predetermined relationship to said voltage across said capacitor at the end of said period of time.

8. A time measurement system as described in claim 7 said motor being coupled to said arm so as to move the same across the potential gradient of said resistance element more slowly than the change in timing voltage across said timing capacitor.

9. A time measurement system comprising receiving means to receive a signal delineating a time interval and having an output which is a function of said interval, a timing capacitor, means responsive to said signal to change the voltage across said capacitor, including switch means, a first source of voltage connected to charge said capacitor, a timing resistor connected to one terminal of said capacitor and connected to the other terminal thereof through said switch means, said switch means being connected to said receiving means so as to receive the output signal thereof, said switch means being actuated by said output to place said resistor in closed circuit with said capacitor for a period of time which is a function of said time interval, thus causing a change in the voltage across said capacitor as a function of said time interval, and means to measure said changed voltage including a potentiometer having a resistance element and a movable arm in contact therewith, a source of voltage conn͟    ͟ss said resistance element, one terminal of said element being connected to a terminal of said capacitor, detector means connected across the series circuit including the portion of said resistance element between the arm thereof and said element terminal and said capacitor and deriving from said series circuit its input consisting of the algebraic sum of the voltage drops across the component parts thereof, a motor controllable by said detector means coupled to said arm and adapted to move said arm along the resistance element of said potentiometer, said detector being adapted to activate said motor and hence move said arm when a first predetermined voltage appears across the input of said detector and to deactivate said motor and hence halt the movement of said arm, when a second predetermined voltage appears across said input, at a voltage point on said resistance element which bears a predetermined relationship to said changed voltage across said capacitor.

10. A time measurement system comprising receiving means to receive a signal delineating a time interval and having an output which is a function of said interval, a timing capacitor, means responsive to said signal to change the voltage across said capacitor, including switch means, a first source of voltage connected to charge said capacitor, a timing resistor connected to one terminal of said capacitor and connected to the other terminal thereof through said switch means, said switch means being connected to said receiving means so as to receive the output signal thereof, said switch means being actuated by said output to place said resistor in closed circuit with said capacitor for a period of time which is a function of said time interval, thus causing a change in the voltage across said capacitor as a function of said time interval, and means to measure said changed voltage including a potentiometer having a resistance element and a movable arm in contact therewith, a source of voltage connected across said resistance element, said timing capacitor having a first terminal connected to said resistance element and having a second terminal not connected thereto, detector means connected across said arm and said second terminal of said timing capacitor, a motor controllable by said detector means coupled to said arm and adapted to move said arm along the resistance element of said potentiometer, said detector being adapted to activate said motor and hence move said arm when a first predetermined voltage appears across the input of said detector and to deactivate said motor and hence halt the movement of said arm, when a second predetermined voltage appears across said input, at a voltage point on said resistance element which bears a predetermined relationship to said changed voltage across said capacitor.

EDWIN F. SHELLEY.

References Cited in the file of this patent

UNITED STATES PATENTS

| Number | Name | Date |
|---|---|---|
| 1,677,157 | Weaver | July 17, 1928 |
| 2,177,569 | Jorgensen et al. | Oct. 24, 1939 |
| 2,178,641 | Neumann | Nov. 7, 1939 |
| 2,392,916 | Gruss | Jan. 15, 1946 |
| 2,422,654 | Bruce | June 24, 1947 |
| 2,422,655 | Hecht | June 24, 1947 |
| 2,504,848 | Kunz | Apr. 18, 1950 |
| 2,511,868 | Newsom | June 20, 1950 |
| 2,513,988 | Wolff | July 5, 1950 |
| 2,537,569 | Ballard | Jan. 9, 1951 |